United States Patent [19]

Black

[11] 3,915,054

[45] Oct. 28, 1975

[54] NON-NESTING FASTENERS

[76] Inventor: Hugh Black, P.O. Box 953, Waynesville, N.C. 28786

[22] Filed: Feb. 7, 1974

[21] Appl. No.: 440,319

[52] U.S. Cl. .................... 85/11; 206/340; 227/120
[51] Int. Cl.² ........................................ F16B 15/00
[58] Field of Search ................ 85/11, 49; 52/753 K; 206/340; 227/120

[56] References Cited
UNITED STATES PATENTS 2,746,601   5/1956   Rebichon ........................... 206/340
3,618,446   11/1971  Black ................................. 85/11

Primary Examiner—Ramon S. Britts
Attorney, Agent, or Firm—Alter and Weiss

[57] ABSTRACT

Wood fasteners having a main body section with peripheral side walls. Longitudinal notches are provided on opposite sides of the main body section above the side walls. The notch eliminates nesting of the fasteners within a magazine or when transported on a carrier.

4 Claims, 5 Drawing Figures

NON-NESTING FASTENERS

This invention relates to wooden fasteners, particularly to wood fasteners that will not "nest" when driven by an automatic driver. This application is an improvement over U.S. Pat. No. 3,618,446 issued on Nov. 9, 1971 and on my application filed Sept. 8, 1972, Ser. No. 287,542 and entitled IMPROVED FASTENER, now U.S. Pat. No. 3,856,139.

With the improvement of assembly techniques in the furniture industry, fasteners amenable to automatic driving have come into wide use. The fasteners are applied to the wood pieces at the point of joinder by an automatic driver tool, such as those that are pneumatically operated.

The drivers act quickly and efficiently. Yet, one important problem is encountered with such a device. The fasteners tend to nest—that is, become locked together in the driver magazine, when the driver jams. This jamming causes major delays in production assembly.

The nesting of the fasteners within the magazine is due to inherent characteristics of the fasteners, such as the curvature and resiliency of the side walls. Also, the top fastener tends to slide on the fastener upon which it is resting thereby destroying the alignment of the individual fastener with the driver. It is not a solution to decrease the angle of curvature, because an excess angle will cause the staples to break. Widening the angle of curvature is also not a solution, because doing so will prevent the fasteners from effectively locking the piece together.

Accordingly, an object of this invention is to provide fasteners which will not nest when transported on their unique carrier or in the magazine of the automatic drivers.

A further object is to provide fasteners which will not cause the driver to jam.

Yet another object of the invention is to provide fasteners having the means for preventing any fasteners resting thereon from sliding.

A related object of this invention is to provide unique fasterners with longitudinal spaced apart notches.

A further object is to provide fasteners with the correct size notches.

A preferred embodiment of the present invention features wood fasteners having a main body section with integral converging peripheral walls. The body section has an elongated hole with an extended section at the rear end thereof. The elongated hole acts as a means for mounting the fasteners on a carrier to feed the fasteners into automatic drive tools. At the bends of the converging peripheral walls longitudinal notches are provided to prevent jamming of the drive tool due to nesting or misalignment of the fasteners.

The above mentioned and other features and objects of this invention and the manner of obtaining them will become more apparent and the invention itself will be best understood by making reference to the following description of an embodiment of the invention taken in conjunction with the accompanying drawings, in which.

Figure 1:
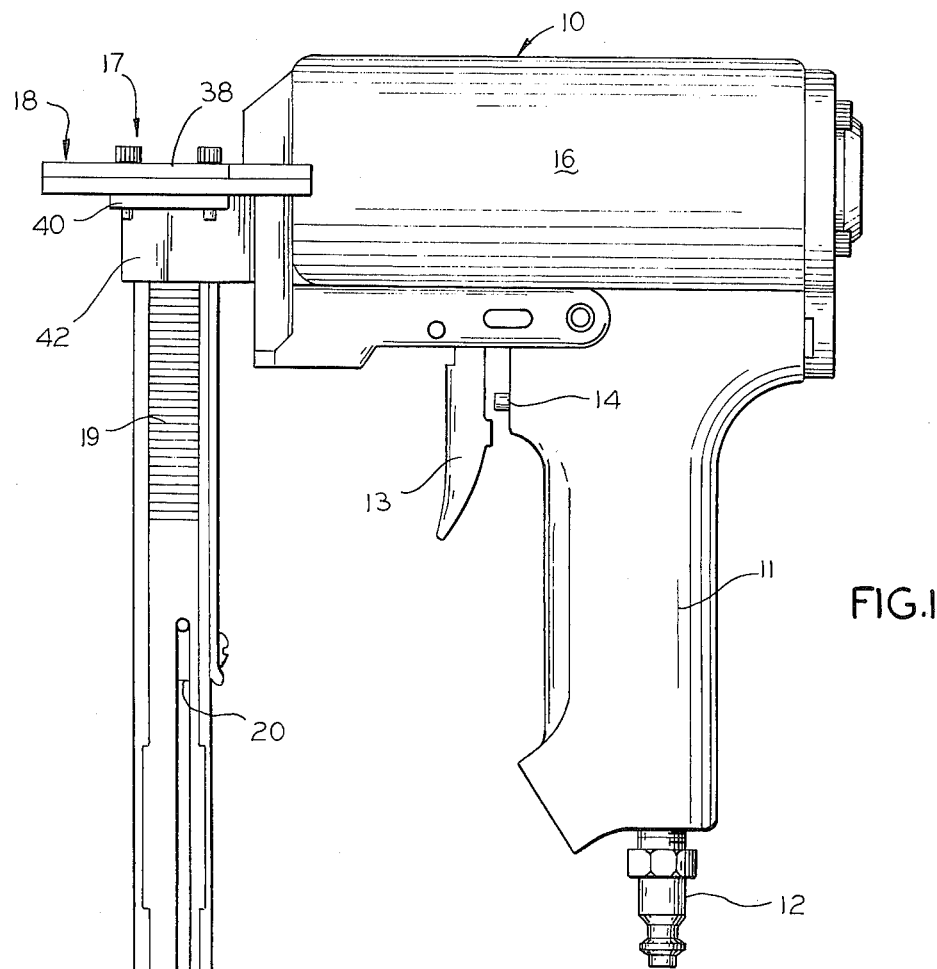
FIG. 1 is a side view of an automatic drive tool, such as an air gun, having a fastener guide means attached thereto for utilization with a carrier having fasteners loaded thereon.

Similar characters of reference indicate corresponding parts throughout the various views. The automatic driving mechanism is shown in FIG. 1 as an air gun 10. The gun 10 is comprised of a handle section 11 having a coupling attachment 12 for coupling an air hose thereto. Adjacent to the handle section is a trigger 13 which when depressed in turn pushes against a plunger 14 to operate a valve (not shown) which actuates the driver (not shown) in the drive piston portion 16 of the air gun.

A fastener guide means 17 is shown attached to the air gun 10. The fastener guide means comprises nose structure 18 for selectively directing the fasteners into the pieces being joined together.

Means are provided for storing the fasteners in a dispensable condition, such as a magazine 19 which depends from the nose structure of the gun for dispensing the fasteners on a one-at-a-time sequential basis.

Means are also provided for forcing the fasteners toward the nose structure. More particularly, a follower 20 comprises a solid piece of material slidably contained within the magazine 19.

Means such as a spring (not shown) are provided for continuously exerting a force on the fasteners 22 mounted on a carrier 21, so that the fasteners are forced into the nose structure. The follower 20 forces the carrier 21 upward until the fasteners abut against the cover plate 38 of the nose structure 18.

Means, such as an attachment plate 40, are used to couple the magazine 19 to the nose structure 18. Similarly, a gun connecting plate 42 may also be used in conjunction with the nose structure connecting plate 40 to reliably hold the magazine in position.

Figure 5:
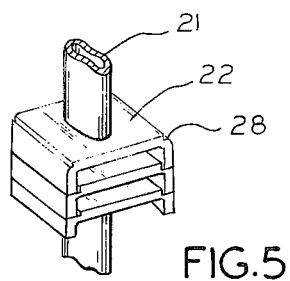
FIG. 5 is a pictorial partial view of the fasteners mounted on the carrier.

As best seen in FIG. 5, an embodiment of the carrier 21 is shaped to resemble a "figure 8". This shaped carrier is used with the smaller fasteners having generally oval openings therein. It has been found that with this shape there is less likelihood of the fasteners, with oval holes therein, nesting while they are being placed on the carrier. The carrier 21 may be made of a thermoplastic material, such as the well known polypropylene, used as the basic material of many tubes. It should be understood that while the carrier 21 is shown as a tube, it could be a rod or a pair of tubes or rods. Also, the cross sectional shape could be circular or rectangular. The guiding criteria is that the carrier can be loaded with fasteners with relative ease and retain the fasteners for a one-at-a-time disbursement of the fasteners.

Figure 2:
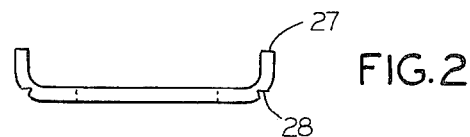
FIG. 2 is a rear view of an embodiment of the present invention.
Figure 3:
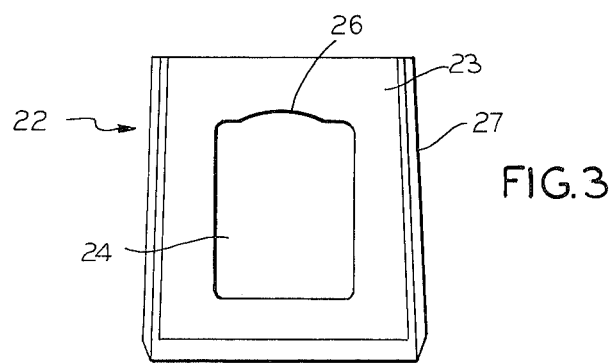
FIG. 3 is a top view of the fastener of the present invention showing the pair of spaced apart longitudinal notches.
Figure 4:
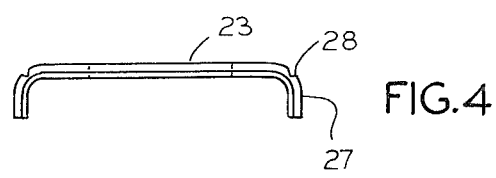
FIG. 4 is a front view of the present invention.

FIGS. 2 – 4 show the improved version of the fastener 22. More particularly, as can be seen in FIG. 3, the fastener 22 comprises a flat main body section 23 having a slightly wedged shape.

At the center of the body 23 is an elongated hole 24. The hole 24 is shown with an elongated section 26 at its posterior end. The hole 24 is approximately centered with regard to the outer peripheral dimensions of the main body section 23. The elongated holes serve the dual purpose of enabling the fasteners to be mounted on the carrier 21 and to prevent cracking of the piece parts being assembled.

As seen in FIGS. 2 and 4 the fasteners have converging peripheral side walls 27, which are forced into wood pieces to be joined together. Between the main body section 23 and the side walls 27 are spaced apart longitudinal notches 28. The distance between the notches equals the distance between the side walls. Therefore, side walls of the fastener above rest within the notches of the fastener below. The nesting of the side walls and the notches prevents lateral sliding of the fasteners.

The notches 28 also eliminate "nesting" (overlapping the sequential fasteners) within the magazine 19. The elimination of lateral sliding and nesting within the magazine 19 prevents jamming of the air gun 10, thereby avoiding delays in furniture production.

The notches 28 extend across the complete outer surface of the fastener 22, at the junction of the main flat body 23 and the converging peripheral side walls 27. The notches 28 are triangular in shape with precise angles used and a precise depth. The precise angles and depth are necessary to prevent weakening of the fastener.

Without the notches nesting occurs on the carrier in the magazine. The carrier is used for transportation, storage and in conjunction with power feed guns.

When the fastener is inserted into the magazine, nesting is prevented and jamming of the drive tool is prevented. With this major problem eliminated, furniture construction can continue without major delays.

While the principles of the invention have been described above in connection with specific apparatus and applications, it is understood that this description is made by way of example, and not as a limitation on the scope of the invention.

I claim:

1. A fastener for securely joining material sections together,
   said fastener comprising an elongated body section having peripheral downwardly extending side walls at opposite sides of said body section arranged to maintain the top surface of said main body section level when said side walls are resting on a level surface,
   said side walls being of uniform height throughout the lengths thereof and being perpendicular to said main body section,
   said main body section having a centrally located aperture therein to facilitate mounting a plurality of said fasteners on a carrier,
   said fastener having spaced apart notch means at the top of each side of said body section along each of the junctions of said body section in said side walls,
   said notch means opening onto the top surface of said main body section and extending a distance at least matching the length of the side walls and matching the locations of said side walls, and
   the distance between said notch means being equal to the distance between the side walls, whereby the side walls of the next upper fastener rest within the notches of the fastener below.

2. The fastener of claim 1 wherein said notch means extends longitudinally across the complete outer surface of the fastener at said junction of said body section and said side walls.

3. The fastener of claim 1 wherein said notch means extend across the entire main body section.

4. The fastener of claim 1 wherein said notch means are triangular in shape.

* * * * *